Patented Apr. 28, 1953

2,636,853

UNITED STATES PATENT OFFICE 2,636,853

PHOTOCHEMICAL PRODUCTION OF BRANCHED PARAFFINIC HYDROCARBONS

Joe L. Franklin, Jr., Baytown, Tex., assignor, by mesne assignments, to Standard Oil Development Company, Elizabeth, N. J., a corporation of Delaware No Drawing. Application December 28, 1949, Serial No. 135,535

4 Claims. (Cl. 204—162)

The present invention relates to a process for alkylating a paraffin with an olefin. More particularly, the present invention relates to a process for reacting a paraffin and an olefin in the presence of an energized metallic sensitizer to form a product containing highly branched hydrocarbons of higher molecular weight than the feed paraffins and olefins.

In accordance with the present invention, highly branched hydrocarbon compounds are produced by subjecting a mixture of low molecular weight paraffin hydrocarbons and low molecular weight olefins to contact with a metallic sensitizer activated by means of radiant energy. On expiration of the reaction period, the reaction products are separated from the metallic sensitizer and, if desired, the unconverted portion in the reaction product may be re-subjected to contact with the metal sensitizer under reaction conditions to form additional quantities of alkylated product.

The metal sensitizer may be any metal which meets the conditions set out below, including proper vapor pressure, absorption characteristics, and sufficient energy in the activated state. Whatever metal sensitizer is employed, it is incorporated in the reaction mixture, including paraffins and olefins, and the reaction mixture is subjected to radiant energy containing frequencies which are capable of energizing the metallic sensitizer. In selecting a metallic sensitizer and source of radiant energy for the reaction, the following conditions must be met:

(A) The metal employed as a sensitizer must exhibit a vapor pressure sufficient to insure that its vapor is present in the hydrocarbon mixture in a concentration sufficient to absorb the activating light efficiently and to an extent that will permit rapid reaction to take place; conveniently, this vapor pressure is at least 0.001 millimeter of mercury at a temperature below about 550° F.

(B) The irradiating light must be of a frequency that can be absorbed by the metallic sensitizer in its ground state in the hydrocarbon mixture. This frequency must correspond to one of the resonance lines of the metal sensitizer.

(C) The sum of the energy of the resonance frequency absorbed by the metal sensitizer and of the energy of the metal-hydrogen bond must correspond to an energy content in excess of that required to rupture one of the paraffin carbon to hydrogen bonds. The quantity of energy required to rupture the carbon to hydrogen bond of the paraffin hydrocarbon depends primarily upon the nature of the bond to be broken, that is, whether it is a primary, secondary, or tertiary bond. The manner in which these bond energies may be calculated is described in detail in an article entitled "Dissociation energies of carbon bonds, and resonance energies in hydrocarbon radicals," by J. S. Roberts et al. in Transactions of the Faraday Society, vol. XLV, pp. 339–357 (1949).

In addition to the aforementioned requirements, the metallic sensitizer should not combine with the feed hydrocarbons or reaction products or with small quantities of contaminants introduced with the feed to form undesirable stable products which may be difficult to remove from the reactor or from the reaction products.

While a relatively large number of metals meet some of these requirements, the most suitable metal sensitizers for my invention are the metals of sub-group B of group II of the periodic table, namely zinc, cadmium, and mercury. Because of their suitable vapor pressure, mercury and cadmium are preferred. The table below indicates the frequencies at which the aforementioned sensitizers may be activated.

TABLE

| Element | Resonance Lines, A. |
|---|---|
| Hg | 2,537 <br> 1,850 |
| Cd | 3,261 <br> 2,289 |
| Zn | 3,076 <br> 2,139 |

The paraffins which may be employed in the paraffin-olefin mixture to be alkylated include propane, normal butane, isobutane, normal pentane, and isopentane or mixtures thereof while the olefin of the feed mixture includes propylene, butene-1, butene-2, isobutylene, pentene-1, pentene-2 and isopentene or mixtures thereof. Thus, it will be seen that the paraffin-olefin feed mixture may comprise, for example, propane and isobutylene or propylene and isobutane. On the other hand, the paraffin-olefin feed mixture may consist of isopentane and isopentene. Although higher molecular weight paraffins and olefins than those indicated above may be employed, it will ordinarily be found preferable to employ paraffins and olefins having no less than three carbon atoms per molecule and no more than five carbon atoms per molecule inasmuch as when higher molecular weight paraffins and olefins are employed in the feed stock, the products formed during the course of the reaction are of higher molecular weight and have lower engine performance than desired. On the other hand, when paraffinic and olefinic hydrocarbons having at least three and no more than five carbon atoms per molecule are employed, the reaction products contain large proportions of highly branched hydrocarbons having superior engine performance ratings. Among other compounds occurring in the reaction products, the following have been identified: 2,2,3,- trimethyl pentane; 2,2,3-trimethyl butane (triptane); 2,2,3,3-tetramethyl butane; 2,2,3,4-tetramethyl pentane; and 2,3-dimethyl butane. While the respective quantities of paraffinic hydrocarbons and olefinic hydrocarbons in the feed mixture are not especially critical, I prefer to employ a feed mixture containing a preponderance of paraffinic hydrocarbons inasmuch as this seems to favor the formation of high concentrations of highly branched hydrocarbons.

Although I prefer to conduct the reaction at atmospheric pressure, the reaction may be carried out at superatmospheric pressures. Pressures as high as 50 atmospheres may be satisfactorily employed.

The temperature at which the reaction is conducted is in the range of a minimum of about 80° F. to a maximum of about 750° F. and the most favorable temperature in a particular instance will depend to some extent upon the nature of the hydrocarbons in the feed mixture but largely upon the metallic sensitizer employed. At temperatures in the range of about 80° F. to about 250° F. good yields of high quality products are secured with mercury as the sensitizer. In the case of cadmium, higher temperatures, in the order of 250° F. to 500° F., are preferably employed because of the lower vapor pressure of cadmium as compared to mercury. In the case of zinc, temperatures as high as 75° F. may be employed.

The process of the present invention is illustrated in the following examples which are included herein by way of illustration and not by way of limitation:

Example I

A 1 to 1 molar mixture of isobutane and propylene were reacted in the presence of mercury vapor. In this run a 15 watt mercury vapor lamp emanating light of 2537 Å. was inserted in a Pyrex jacket provided with inlet and outlet connections so that a continuous stream of reactants could be irradiated with light emanating from the lamp. Several globules of liquid mercury were placed in the outer Pyrex jacket to provide an adequate concentration of mercury vapor in the hydrocarbon vapors. Provision was made to heat the jacket and the lamp and to maintain the assembly at a relatively constant temperature of 175° F. The pressure inside the Pyrex jacket was 760 millimeters of mercury and the residence time of the reactants in the jacket was approximately four minutes. When analyzed, the product included 19% 2,2,3-trimethyl butane; 33% 2,2,3,3-tetramethyl butane, as well as 30% olefins and 18% of unidentified other hydrocarbons.

Example II

In another reaction employing the reactor assembly referred to in Example I and again using globules of mercury in the reactor, a 1 to 1 molar mixture of isobutane and isobutylene was irradiated at a temperature of 178° F. and at a pressure of 760 millimeters Hg for a residence time of 4.9 minutes. When analyzed the reaction product consisted of 40% 2,2,3,3-tetramethyl butane, 40% olefins, and 20% of other unidentified hydrocarbons.

While the aforementioned examples demonstrate that highly branched hydrocarbons may be prepared from isobutane-propylene and isobutane-isobutylene mixtures, it will be understood that highly branched hydrocarbons may be prepared just as readily from other hereinbefore indicated mixtures.

What I wish to claim as new and useful and to secure by Letters Patent is:

1. A method for alkylating a paraffin having at least three and no more than five carbon atoms with a mono-olefin having at least three and no more than five carbon atoms per molecule which comprises reacting a mixture of said paraffin and olefin in which the paraffin is in excess of the olefin in a reaction zone at a temperature in the range of 80° F. to 750° F. at a pressure at least atmospheric in the presence of mercury as a sensitizer by exposing a continuous stream of said mixture flowing through said reaction zone containing said sensitizer under said conditions of temperature and pressure to a resonance energy frequency corresponding at least to one of the resonance lines of the sensitizer for a time of aproximately 4 minutes to form a saturated branched product.

2. A method for alkylating a paraffin with a mono-olefin which comprises reacting a mixture of isobutane and propylene in which the isobutane is in excess of the propylene in a reaction zone at a temperature in the range between 80° and 250° F. at atmospheric pressure in the presence of mercury as a sensitizer by exposing a continuous stream of said mixture flowing through said reaction zone under said conditions of temperature and pressure to a resonance energy frequency corresponding at least to one of the resonance lines of said sensitizer for a time for approximately 4 minutes to form a saturated branched product, and recovering said product.

3. A method in accordance with claim 1 in which the paraffin is an isoparaffin.

4. A method for alkylating isobutane with propylene which comprises reacting an equi-molar mixture of isobutane and propylene in a reaction zone at a temperature of approximately 175° F. and at a pressure about 760 millimeters Hg by exposing a continuous stream of the mixture flowing throughout the reaction zone in the presence of mercury vapor to radiations of the wave length of 2537 A. for about 4 minutes to form a product comprising triptane and other branched saturated hydrocarbons of a molecular weight greater than that of the reactants.

JOE L. FRANKLIN, Jr.

References Cited in the file of this patent

UNITED STATES PATENTS

| Number | Name | Date |
|---|---|---|
| 1,746,168 | Taylor | Feb. 4, 1930 |
| 2,462,669 | Percy | Feb. 22, 1949 |

FOREIGN PATENTS

| Number | Country | Date |
|---|---|---|
| 307,406 | Great Britain | Mar. 4, 1929 |

OTHER REFERENCES

Olson et al., Journal American Chemical Society, vol. 48 (Feb. 1926), pages 389–396.

Taylor et al., Journal American Chemical Society, vol. 51 (Oct. 1929), pages 2922–2936.

Steacie et al., Journal Chemical Physics, vol. 12 (Jan. 1944), pages 34–36.

Le Roy, Canadian Chemistry and Process Industries, June 1944, pages 430–431.

Roberts et al., Transactions of the Faraday Society, vol. XLV (1949), pages 339–357.

Ellis et al., Chemical Action of Ultraviolet Rays (1941), pages 257–259.